United States Patent [19]

Hughes

[11] 4,328,020
[45] May 4, 1982

[54] MELTING GLASS WITH REDUCED $NO_x$ EMISSIONS

[75] Inventor: David E. Hughes, Monroeville, Pa.

[73] Assignee: PPG Industries, Inc., Pittsburgh, Pa.

[21] Appl. No.: 209,631

[22] Filed: Nov. 24, 1980

[51] Int. Cl.³ ............................................. C03B 5/16
[52] U.S. Cl. ........................................ 65/27; 65/134;
65/335; 65/337; 423/235; 432/180; 432/181
[58] Field of Search .................... 65/27, 168, 134, 337,
65/335; 432/180, 181; 423/235, 235 D

[56] References Cited

U.S. PATENT DOCUMENTS

| | | | |
|---|---|---|---|
| 3,294,509 | 12/1966 | Soubier et al. | 65/134 |
| 3,900,554 | 8/1975 | Lyon | 423/235 |
| 4,115,515 | 9/1978 | Tenner et al. | 423/235 |
| 4,216,060 | 8/1980 | Murata et al. | 423/235 D |
| 4,235,851 | 11/1980 | Flockenhaus | 202/140 X |

Primary Examiner—Arthur D. Kellogg
Attorney, Agent, or Firm—Dennis G. Millman

[57] ABSTRACT

$NO_x$ emissions from a glass melting furnace are reduced by injecting ammonia into the exhaust gas stream on a flue between primary and secondary regenerator chambers in one embodiment, and in staged zones within a regenerator in another embodiment.

10 Claims, 5 Drawing Figures

MELTING GLASS WITH REDUCED NO$_x$ EMISSIONS

Melting of glass entails the combustion of large amounts of fuel in a melting furnace in order to provide the required melting temperatures by direct heating. The fuel (usually natural gas and sometimes fuel oil) is usually mixed with an excess of air beyond that theoretically required for complete combustion in order to assure that complete combustion actually occurs within the furnace for the sake of thermal efficiency, and, particularly in the case of flat glass melting operations, to assure that oxidizing conditions are maintained within the furnace. This combination of conditions within a glass furnace is conducive to the oxidation of nitrogen in the combustion air to NO$_x$.

NO$_x$ is a short-hand designation for NO and/or NO$_2$. In the high temperature conditions of a glass melting furnace, the oxide of nitrogen formed is almost entirely NO, but after exhaust containing NO is released to the atmosphere, much of the NO is converted to NO$_2$. NO$_2$ is considered an objectionable air pollutant; it is also believed to be involved in the chemistry of smog formation. Therefore, large volume combustion sources such as glass melting furnaces are susceptible to governmetal regulation that may severely restrict their operation.

Many proposals have been made for controlling NO$_x$ emissions from boilers, internal combustion engines, and the like, but most are incompatible with process furnaces as employed for melting glass. Many of the previous proposals involve catalytic destruction of NO$_x$, but catalytic treatment of glass furnace emissions has been found to be unsatisfactory because the required catalyst contact devices quickly become pugged and corroded due to the particulate content and corrosiveness of glass furnace exhaust. Other proposals involve modifying combustion conditions, but substantial modifications in a glass melting furnace are restricted by the requirements of the melting process. Some NO$_x$ control proposals involve treating the exhaust gas within narrow temperature ranges, but in a glass furnace employing regenerators, wherein the firing is reversed periodically, the exhaust gas temperatures are continually changing. Yet another category of prior art NO$_x$ removal processes entail chemically reacting the NO$_x$ at reduced temperature, usually in a liquid phase. Such techniques appear to be prohibitively costly for application to glass furnace emissions due to the large cooling capacity and chemical consumption requirements and liquid waste disposal problems. Accordingly, it has heretofore been believed that the various known NO$_x$ control methods could not practically be applied to glass melting furnaces.

A non-catalytic process for selectively reducing NO to nitrogen and water by injecting ammonia into an exhaust gas steam is disclosed in U.S. Pat. No. 3,900,554. Because it does not require catalysts or process modifications, such a technique would be attractive to glass producers, except that the process is effective in only a narrow range of temperatures. This is because the following competing reactions take place in typical exhaust gas environments:

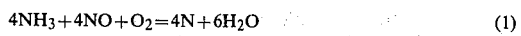

$$4NH_3 + 4NO + O_2 = 4N + 6H_2O \quad (1)$$

$$4NH_3 + 5O_2 = 4NO + 6H_2O \quad (2)$$

At temperatures below the critical range, neither reaction takes place appreciably, so there is no improvement in NO$_x$ emissions. Within the temperature range, reaction (1) predominates, and therefore there is a net reduction of NO. At higher temperatures, reaction (2) becomes more significant, with the result that the amount of NO in the exhaust gas stream is increased. Therefore, this NO$_x$ reduction method has heretofore been considered limited in its applicability to boilers and the like where well-defined, stable temperature zones could be identified and utilized for ammonia injection. The patent also discloses that the useful temperature range can be broadened by injecting hydrogen together with the ammonia, but not to the extent that temperature variability can be disregarded. A variation of this technique is disclosed in U.S. Pat. No. 4,115,515 where ammonia is injected at two different zones of a boiler, with hydrogen at one location and without hydrogen at the other location.

SUMMARY OF THE INVENTION

It has now been discovered that selective, non-catalytic reduction of NO$_x$ by ammonia injection can be effectively employed on glass furnace exhaust gas streams under certain conditions.

In the preferred embodiment, in connection with a glass furnace having a two-stage regenerator system, it has been found that suitable conditions for ammonia reduction of NO$_x$ exist, or can be created, for a substantial portion of each firing cycle in the flue connecting the primary and secondary regenerator chambers. Not only are the thermal conditions appropriate for NO$_x$ reduction, but the relatively narrow flue location lends itself to thorough mixing of substantially the entire throughput stream with the injected reducing agent. Ammonia injection is discontinued whenever the temperature of the exhaust gas passing through the flue falls outside of range of 870° C. to 1090° C. (700° C. to 1090° C. if accompanied by hydrogen); however, it has been found that typically a flue location can be selected at which the required thermal conditions exist during a major portion of the exhaust phase of the firing cycle. Thus, a substantial portion of the overall effluent is treated. If appropriate temperatures are not attained within the flue, or are not attained for a sufficient length of time, adjustments may be made by bleeding air into the flue to lower excessively high temperature, or the exhaust gas in the flue may be reheated by means of an auxiliary burner to raise low temperatures.

A second embodiment of the invention relates to type of glass furnaces that employ single chamber regenerators, wherein the conditions for non-catalytic reduction of NO$_x$ by ammonia typically are found within the regenerator packing in locations that change during the firing cycle. In this embodiment, ammonia is injected into two or more zones of the regenerator sequentially as the temperature in each zone passes through the effective NO$_x$ reduction range.

THE DRAWINGS

DETAILED DESCRIPTION

The invention will be described herein in conjunction with a typical flat glass melting furnace and it is in that context that the combination of regenerator structures and exhaust gas temperatures will be found in which the invention will find its greatest utility. However, the principles of the present invention may be applied to any type of glass melting furnace in which the same or similar conditions are encountered.

Figure 1:
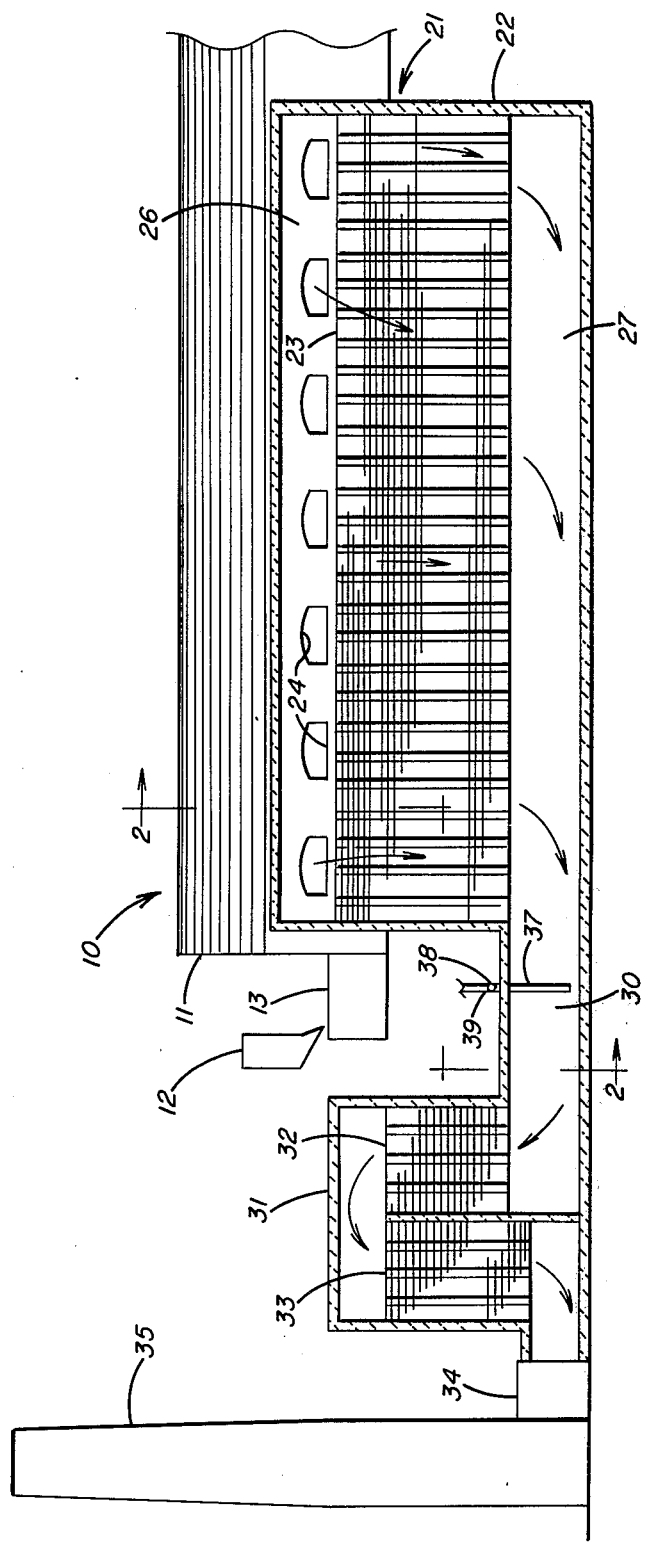
FIG. 1 is side view of a flat glass melting furnace along a longitudinal cross-section through the regenerator system. The regenerator is of the type having two chambers, and an ammonia injection grid in accordance with the present invention is depicted in the flue between the regenerator chamber.
Figure 2:
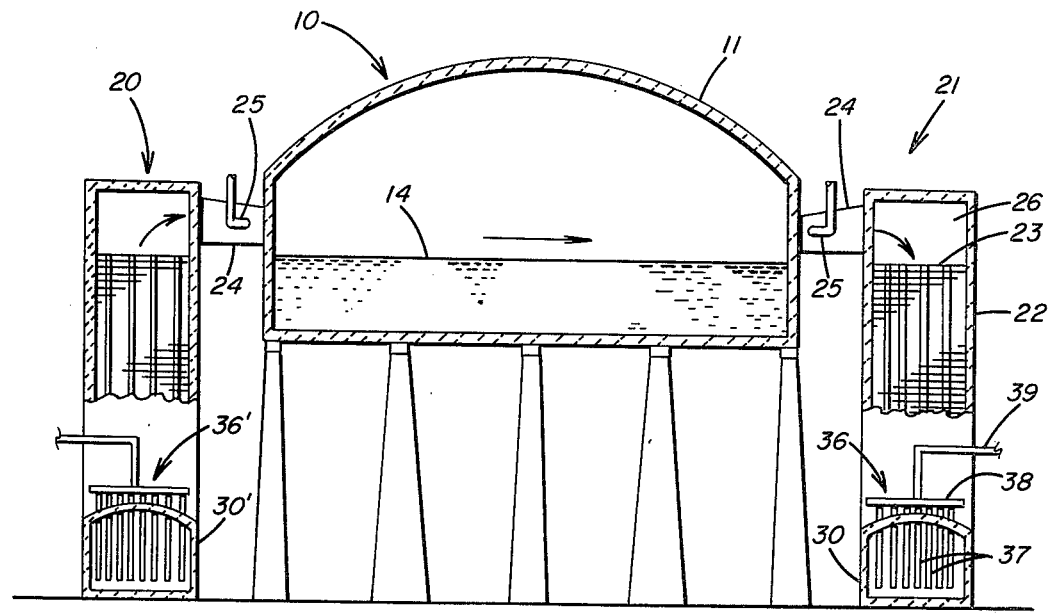
FIG. 2 is a lateral cross-sectional view of the flat glass furnace of FIG. 1, taken along line 2—2 in FIG. 1.

In FIGS. 1 and 2 there is dipicted a conventional flat glass melting furnace 10 having a melting chamber 11 into which raw glassmaking ingredients are fed from a hopper 12 into an inlet extension 13 of the furnace (FIG. 1). The raw glass batch materials are deposited onto a pool of molten glass 14 (FIG. 2) maintained within the melter. The furnace is of the well known cross-fired, regenerative type wherein the melter 11 is flanked by a pair of primary regenerators 20 and 21 of like construction. Each regenerator includes a refractory housing 22 containing a bed of regenerator packing 23 which comprises a checker structure of refractory brick permitting the alternate passage of air and exhaust gas therethrough. Each of the primary regenerators 20 and 21 communicates with the melter 11 by means of a plurality of ports 24 spaced along the sides of the melter. Each port opens at one end to the interior of the melter and at the other end to a plenum space 26 above the packing 23 in regenerator. Below the packing in each regenerator is a distributing space 27 which communicates at one end with a flue 30. In the embodiment shown in FIG. 1 the flue 30 leads to a secondary regenerator 31 which may include a first pass checker packing 32 and a second pass checker packing 33. From the secondary regenerator the gas flows through a reversing valve mechanism 34 and then to a smokestack 35.

Flows through the furnace are periodically reversed (e.g., about every 10 minutes). In the mode of operation depicted in the drawings, the gas flows are from left to right (as viewed in FIG. 2) wherein incoming combustion air enters through the left-hand regenerator 20 and exhaust gases exit from the melter through the right-hand regenerator 21. The incoming combustion air is preheated by the regenerator packings on the left side and fuel (natural gas or oil) is mixed with the preheated air by means of burner nozzles 25 in the left-hand ports 24, whereby flames extend from left to right over the molten glass 14 within the melter. During this phase of the firing cycle the burner nozzles 25 in the right-hand ports remain inactive. The exhaust gases leaving the melter through the right-hand ports 24 pass through the primary regenerator 21 where heat from the gas steam is transferred to the checker packing 23. In the preferred embodiment depicted, the recovery of waste heat by the regenerator system is only partially accomplished by the primary regenerator 21. Additional heat recovery is accomplished farther downstream in the secondary regenerator 31. When the temperature of the checker packing approaches its upper limits, the firing is reversed. The burners on the left side of the furnace are turned off and the burners on the right side are turned on, and incoming combustion air is passed through the right-hand regenerator 21 and the exhaust gases leave the melter by way of the left-hand regenerator 20.

Referring still to FIGS. 1 and 2, there is shown the preferred embodiment of the invention wherein ammonia injection for $NO_x$ reduction is carried out in each flue 30 and 30' between each primary regenerator and the corresponding secondary regenerator. In a glass melting furnace of this type it has been found that the temperatures of the exhaust gases passing through the flue 30 lie within the preferred $NO_x$ reduction range of 870° C. to 1090° C. during a substantial portion of the exhaust phase of the firing cycle. A preferred means for injecting ammonia into the exhaust stream is a grid 36 comprised of a plurality of apertured tubes 37 of a heat resistant material extending into the flue 30. Each tube 37 is in communication with a header pipe 38 which in turn communicates with a supply pipe 39. The tubes 37 are arranged to promote thorough mixing of ammonia with substantially the entire stream of exhaust gas passing through the flue. An identical grid 36' may be provided in the flue 30' on the opposite side of the furnace.

In the firing mode depicted in the drawings, ammonia injection takes place in the right-hand grid 36 and the left hand grid 36' is turned off. Immediately after firing reversal, the temperature of the exhaust gas passing through the flue 30 on the exhaust side is generally found to be below the prescribed $NO_x$ reduction range but rises into the range within about 1 to 2 minutes, for example, whereupon ammonia injection may be initiated. Ammonia injection continues as the temperature of the exhaust gas in the flue continues to rise until the temperature exceeds the $NO_x$ reduction range, whereupon ammonia injection is discontinued. However, it has been found that with a 10 minute interval between firing reversals, ammonia injection may typically be continued throughout the remainder of the exhaust phase. When firing is reversed the ammonia injection may be shifted to the grid on the opposite side of the furnace. In this manner the exhaust gas stream may be subjected to $NO_x$ reduction during a substantial portion (preferably a majority) of the overall firing cycle. However, it should be understood that improvements in average $NO_x$ emissions may be obtained by treating the exhaust gas stream for shorter periods of time than the maximum feasible times. For example, substantial improvements could be obtained even if only one grid is provided and ammonia injection is carried out on only one side of the furnace.

Ammonia gas is preferably provided to the grid 36 with a carrier gas (e.g., air or steam). The flow rate of ammonia will depend upon the degree of $NO_x$ reduction desired and the efficiency of the reaction. As may be seen in equation (1) above, theoretically one mole of ammonia reduces on mole of NO, but of course in actual practice, reaction efficiencies less than 100% are obtained due to imperfect mixing, less than ideal thermal conditions, etc. Therefore, a molar ratio of ammonia to nitrogen oxide greater than 1 is usually required to maximize $NO_x$ reduction. However, in many cases maximization may not be required and therefore, for the sake of economy, molar ratios of 1 or less may be employed. Typically, molar ratios of $NH_3$ to $NO_3$ between 0.5 and 2.0 are suitable. Ratios close to 1.0 yield a balance between economy and effectiveness.

The theoretical aspects of the noncatalytic selective reduction of $NO_x$ by ammonia are set forth in the aforesaid U.S. Pat. No. 3,900,554 the disclosure of which is hereby incorporated by reference. The presence of oxygen is required for the reduction to proceed. In a flat glass furnace conventionally fired with an excess of air, it has been found that sufficient oxygen is normally present without requiring modification of the combustion parameters.

Figure 4:
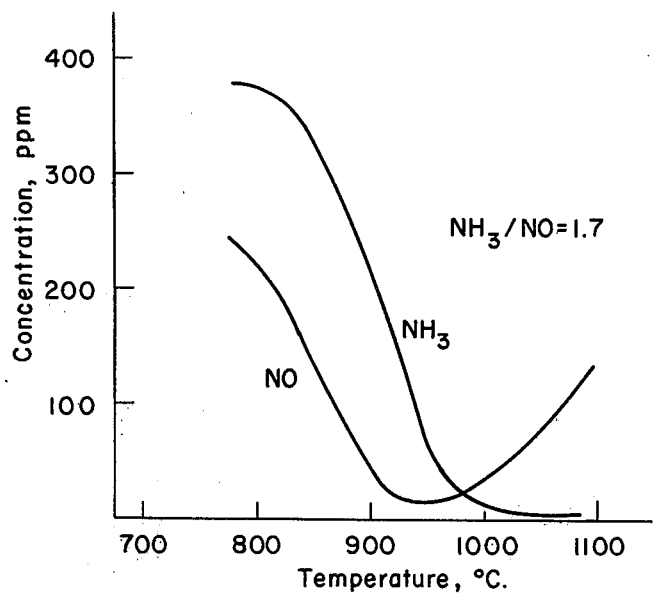
FIG. 4 is a plot of injection zone temperatures versus output concentrations of NO and $NH_3$, illustrating the optimum temperature range.

The sensitivity of the reduction reaction to temperature is illustrated in FIG. 4. FIG. 4 represents an example of a published laboratory test and shows a plot of final concentration (in parts per million) of NO and ammonia plotted against temperature in the reaction zone. The particular example had an ammonia to NO molar ratio of 1.7. It can be seen that the ammonia concentration drops sharply above 800° C., evidencing a chemical reaction and continues to decrease, approaching zero at higher temperatures. The NO, on the other hand, reaches a minimum between 900° and 1000° C. and then begins to increase, indicating a counter-productive reaction at higher temperatures. Since it is undesirable from both an environmental and economic standpoint to permit ammonia to pass out through the exhaust system, it is preferred to inject ammonia into the exhaust stream in a zone where the temperature corresponds to the lower end of the ammonia curve without deviating unduly from the minimum on the NO curve. Thus, the preferred range for ammonia injection without hydrogen is between 870° C. and 1090° C. Treatment times may be extended by modifying the temperature in the flue, such as by bleeding external air into the flue to lower the temperature, or by providing an auxiliary burner in the flue to raise the temperature.

Figure 3:
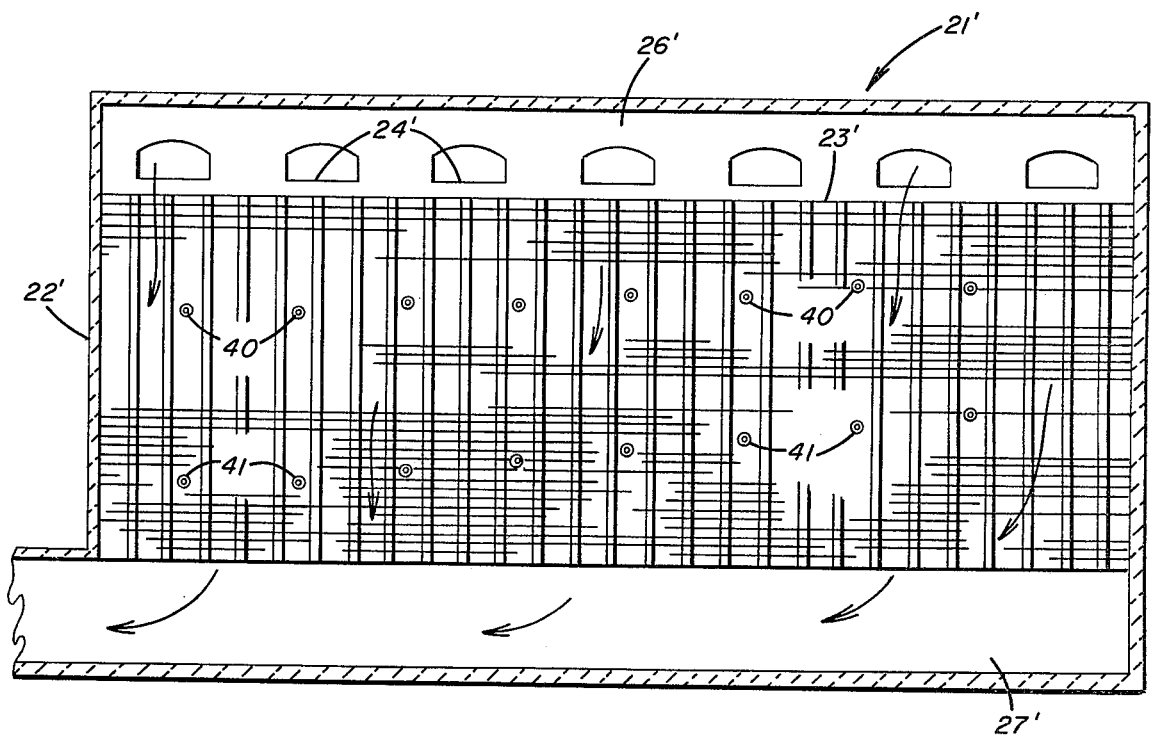
FIG 3 is a longitudinal section through a single chamber regenerator, showing an alternate ammonia injection arrangement.

FIG. 3 shows an alternative embodiment of the present invention relating to a different type of regenerative glass melting furnace in commercial use wherein the regenerator system on each side of the melter consists of a single regenerator chamber 21' having a single regenerator checker packing 23'. The construction of the regenerator 21' is essentially the same as that of the primary regenerator 21 described above in connection with the previous embodiment and the primed numerals in FIG. 3 refer to like elements as described in connection with FIG. 1. In a large regenerator such as 21' the temperature of the exhaust gas reaching the bottom space 27' may be below the effective $NO_x$ reduction range during most or all of the firing cycle. Furthermore, the zone of appropriate temperatures progresses downwardly through the checker packing 23' during the course of each exhaust phase of the firing cycle. Therefore, a convenient location for injection of ammonia during a substantial portion of the firing cycle does not present itself in such a regenerator. Therefore, in this embodiment of the invention ammonia injection takes place in staged zones of the regenerator packing. In the arrangement shown in FIG. 3 there are two stages as defined by an upper row of apertured ammonia injection tubes 40 and a lower row of apertured ammonia injection tubes 41. Injection takes place initially through tubes 40 and subsequently through tubes 41 in a manner to be described in greater detail below.

Figure 5:
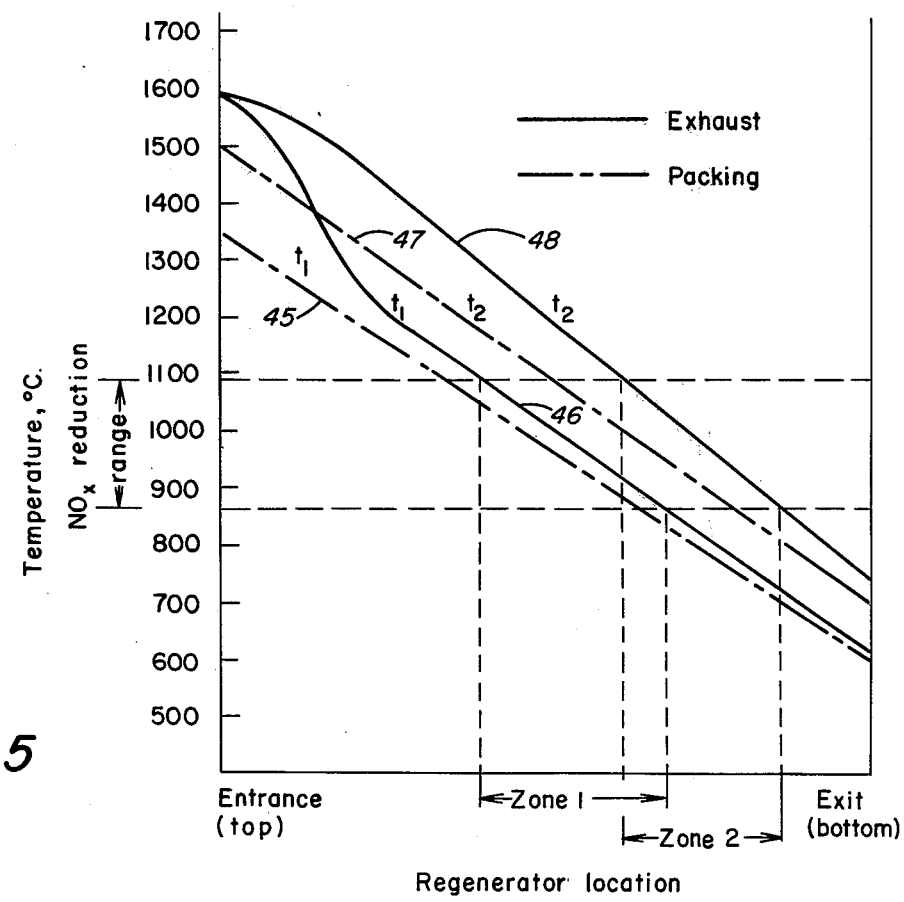
FIG. 5 is a plot of regenerator location versus temperature at two different times during the exhaust phase of a hypothetical firing cycle.

In FIG. 5 there is shown graphically an approximation of a thermal profile from top to bottom across the regenerator packing of the FIG. 3 embodiment along a given vertical line at two different times during one exhaust phase. Line 45 represents the temperature variation from top to bottom of the regenerator at a time $t_1$ and curve 46 represents the adjacent exhaust gas temperatures at the same time. Line 47 represents the packing temperatures at a later time $t_2$ and curve 48 represents the corresponding exhaust gas temperatures at the same time $t_2$. FIG. 5 shows that at any given time the exhaust gas temperature decreases from top (entrance) to bottom (exit) of the regenerator, and that at any given location in the regenerator packing the temperature of the exhaust gas passing therethrough is increasing with time. Additionally, it can be seen from the figure that at a given time the exhaust gas is within the $NO_x$ reduction range in only a limited zone of the regenerator and that the zone of the regenerator in which the required temperature conditions exist moves toward the exit side of the regenerator with time. Thus, at time $t_1$ the appropriate temperature conditions for $NO_x$ reduction are present in "zone 1" of the regenerator depicted in FIG. 5 and at time $t_2$ the conditions are present in "zone 2" of the regenerator. Therefore, if the upper row of injection tubes 40 in FIG. 3 lies within zone 1 and the lower row of injection tubes 41 lie within zone 2, it can be seen graphically in FIG. 5 that ammonia injection should take place from the upper tubes 40 at time $t_1$ and at some time subsequent to time $t_1$ ammonia injection should be discontinued from the tubes 40 and should be shifted to the lower tubes 41 where ammonia injection may continue for a period of time including time $t_2$. There may be a hiatus between injection from one row of tubes and injection from the subsequent row of tubes if it is not critical to maximize the amount of exhaust treated, but preferably the locations of the adjacent rows of injection tubes would be chosen so that both rows would lie within the $NO_x$ reduction range at an intermediate time when injection may be shifted from the first row to the second row without interruption. In some cases it may be desirable to provide more than two rows of injection tubes so as to prolong the overall treatment time. In the FIG. 3 embodiment, it may be desirable to preheat the ammonia and carrier gas before injection in order to avoid creating excessive thermal stresses in the packing brickwork.

Other factors may influence the location of the rows of injection tubes in the FIG. 3 embodiment as well as the locations of the individual tubes within a given row. For example, flow conditions in a regenerator of the type shown in FIG. 3 are seldom uniform, and therefore isothermal conditions seldom exist in any horizontal plane through such a regenerator. Accordingly, a row of injection nozzles may be sloped as shown in FIG. 3 or otherwise contoured to conform to an isotherm within the regenerator. The sloped arrangement of injection tubes shown in FIG. 3 is intended to compensate for the inherent bias of exhaust gas flows toward the left side of the regenerator as viewed in FIG. 3 which causes temperatures on the left side to increase more rapidly than those on the right side. Even more complex injection patterns may be envisioned wherein the injection sequence may vary from one side of the regenerator to the other as well as between rows. Ultimately, the maximum degree of control could be obtained with a system that provides a large number of injection tubes arrayed throughout the regenerator packing with each tube being individually activated in accordance with a predetermined program.

Either of the above-described embodiments of the present invention may include variations wherein hydrogen together with ammonia are injected into the exhaust gas stream to reduce $NO_x$ as disclosed in U.S.

Pat. Nos. 3,900,554 and 4,115,515. The inclusion of hydrogen extends the lower limit of the reduction temperature range to about 700° C., thereby permitting reduction to take place at locations or times in which the temperature of the exhaust gases would be below the range for effective reduction of $NO_x$ by ammonia alone. This may be implemented in either of the embodiments by first injecting an ammonia-hydrogen mixture when the exhaust gas temperatures are between 700° C. and 870° C., and subsequently injecting ammonia alone at the same location when the temperature rises above 870° C. Alternatively, the modification could be implemented in the FIG. 1 embodiment, for example, by providing a second injection grid downstream from the grid 39 in the flue for injecting the ammonia-hydrogen mixture in a lower temperature region simultaneously with the injection of ammonia alone at the upstream location. Similarly, in the FIG. 3 embodiment the lower row of injection tubes 41 may inject the ammonia-hydrogen mixture at the same time that the upper row of tubes 40 is injecting ammonia alone, and subsequently the lower row may be switched to injecting ammonia alone.

Specific preferred embodiments have been described in detail for the sake of illustrating the invention and for disclosing the best mode, but it should be understood that other variations and modification as are known to those of skill in the art may be resorted to without departing from the scope of the invention as defined by the claims which follow.

I claim:

1. A method of melting glass comprising: feeding glass batch materials into a melting furnace where they are heated by combustion of fuel which produces an exhaust gas stream including $NO_x$ compounds; during a series of exhaust phases of a firing cycle, passing the exhaust gas stream through a first regenerator and then through a flue to a second regenerator so as to heat the regenerators, whereby the temperature of exhaust gas passing through the flue rises during each exhaust phase from a temperature below 870° C. to a temperature above 870° C.; alternating the exhaust phases with a series of reverse flow phases during which air is passed through the second regenerator and then through the flue to the first regenerator so as to cool the regenerators; and injecting substantial amounts of ammonia into the exhaust gas stream passing through the flue only when the exhaust gas temperature there is from 870° C. to 1090° C., thereby reducing the $NO_x$ content of the exhaust gas stream.

2. A method of melting glass comprising: feeding glass batch materials into a melting furnace where they are heated by combustion of fuel which produces an exhaust gas stream including $NO_x$ compounds; during a series of exhaust phases of a firing cycle, passing the exhaust gas stream through a first regenerator and then through a flue to a second regenerator so as to heat the regenerators, whereby the temperature of gas passing through the flue rises during each exhaust phase from a temperature below 700° C. to a temperature above 700° C.; alternating the exhaust phases with a series of reverse flow phases during which air is passed through the second regenerator and then through the flue to the first regenerator so as to cool the regenerators; and injecting substantial amounts of ammonia and hydrogen into the exhaust gas stream passing through the flue only when the exhaust gas temperature there is from 700° C. to 1090° C., thereby reducing the $NO_x$ content of the exhaust gas stream.

3. The method of claim 1 or 2 wherein the combustion of the fuel is carried out by supplying air in an amount in excess of that theoretically required for complete combustion.

4. The method of claim 1 or 2 wherein the ammonia injection takes place during only a portion of each exhaust flow phase.

5. A method of melting glass comprising: feeding glass batch materials into a melting furnace where they are heated by combustion of fuel which produces an exhaust gas stream including $NO_x$ compounds, passing the exhaust gas stream through a regenerator chamber wherein heat is transferred from the exhaust gas to regenerator packing, whereby the temperature of the exhaust gas decreases during passage through the regenerator and the temperature of exhaust gas passing through a given portion of the regenerator increases with time, initiating injection of substantial amounts of ammonia into the exhaust gas passing through a first portion of the regenerator when the temperature of the exhaust gas there rises above 870° C., subsequently initiating injection of substantial amounts of ammonia into the exhaust gas passing through a second portion of the regenerator that is downstream from the first portion when the temperature of the exhaust gas passing through the second portion rises above 870° C., and discontinuing substantial ammonia injection in each zone when the exhaust gas temperature therein rises above 1090° C., thereby reducing the $NO_x$ content of the exhaust gas stream.

6. A method of melting glass comprising: feeding glass batch materials into a melting furnace where they are heated by combustion of fuel which produces an exhaust gas stream including $NO_x$ compounds, passing the exhaust gas stream through a regenerator chamber wherein heat is transferred from the exhaust gas to the regenerator packing, whereby the temperature of the exhaust gas decreases during passage through the regenerator and the temperature of exhaust gas passing through a given portion of the regenerator increases with time, initiating injection of substantial amounts of ammonia and hydrogen into the exhaust gas passing through a first portion of the regenerator when the temperature of the exhaust gas there rises above 700° C., subsequently initiating injection of substantial amounts of ammonia and hydrogen into the exhaust gas passing through a second portion of the regenerator that is downstream from the first portion when the temperature of the exhaust gas passing through the second portion rises above 700° C., and discontinuing substantial ammonia and hydrogen injection in each zone when the exhaust gas temperature therein rises above 1090° C., thereby reducing the $NO_x$ content of the exhaust gas stream.

7. The method of claim 6 wherein injection of hydrogen in each zone is discontinued when the exhaust gas temperature therein rises above 870° C.

8. A furnace for melting glass of the regenerative, periodically reversing fired type having a combustion chamber and a regenerator chamber in communication therewith adapted to pass exhaust gas from the combustion chamber, the exhaust gas passing from an upstream zone to a downstream zone in the regenerator, a first series of nozzle means for injecting ammonia into the upstream zone of the regenerator chamber, a second series of nozzle means for injecting ammonia into the downstream zone of the regenerator chamber, valve means for controlling flow of ammonia to the first and second series of nozzle means independently, and control means associated with the valve means for initiating and discontinuing flow of ammonia to the first and second zones separately in accordance with suitability of thermal conditions in each respective zone for non-catalytic reduction of $NO_x$ by ammonia.

9. The furnace of claim 8 wherein each of the ammonia nozzle means comprises a plurality of tubes extending into the respective zone of the regenerator.

10. The furnace of claim 9 wherein each of the pluralities of tubes extends in a row across the regenerator in a direction generally transverse to the flow of gas through the respective zone of the regenerator, and the rows are spaced apart in the general direction of gas flow through the regenerator.

* * * * *